United States Patent [19]
Bray

[11] 4,092,948
[45] June 6, 1978

[54] GAUGE FOR INDICATING AVAILABLE WATER SUPPLY

[76] Inventor: Thomas Bray, 1910 Bahama Dr., Miramar, Fla. 33023

[21] Appl. No.: 756,741

[22] Filed: Jan. 5, 1977

[51] Int. Cl.² ............................................. G01D 1/00
[52] U.S. Cl. ........................ 116/114 PV; 116/129 R; 116/130
[58] Field of Search ........ 116/114 PV, 129 R, 129 F, 116/129 AB, 129 T, 129 A, 129 K, 130, 134, 88 G; 73/388; 235/78, 78 F, 78 G, 78 M, 88 F, 88 G, 88 M, 88

[56] References Cited

U.S. PATENT DOCUMENTS 2,252,749  8/1941  Backman et al. ................... 235/88
3,745,968  7/1973  Possati ............................. 116/129 R Primary Examiner—James J. Gill

[57] ABSTRACT

A gauge for indicating available water supply is disclosed which may be used in combination with a water pressure gauge (compound gauge) attached to a fire truck pump for checking fire hydrant pressure. Compound gauges are standard on most fire engines. The gauge is positionable over such a water pressure gauge and indicates the additional number of fire hoses that may be connected to a fire truck pump as the water pressure in the hydrant drops when water starts to flow. The water delivered from a fire hydrant decreases exponentially with a linear drop in pressure and the more demand placed on a hydrant the more this will cause a corresponding drop in pressure. The apparatus of the present invention uses an indicator that converts a linear decrease of water pressure into an exponential decrease in the number of additional fire hoses that a given hydrant will supply.

8 Claims, 4 Drawing Figures

U.S. Patent     June 6, 1978     4,092,948
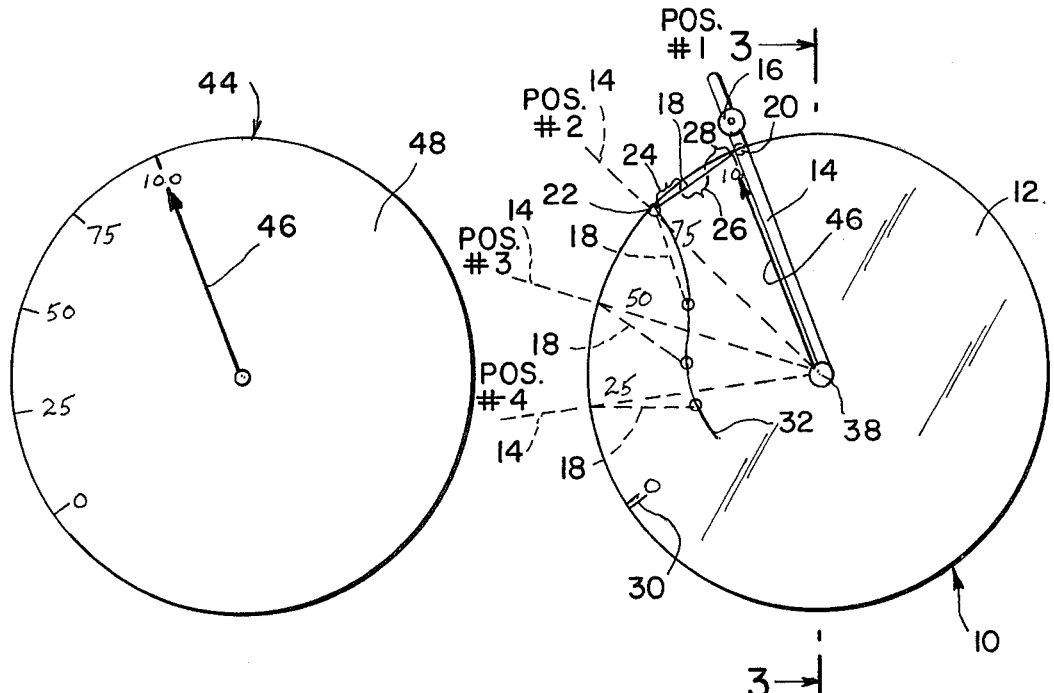
Fig. 1
Fig. 2
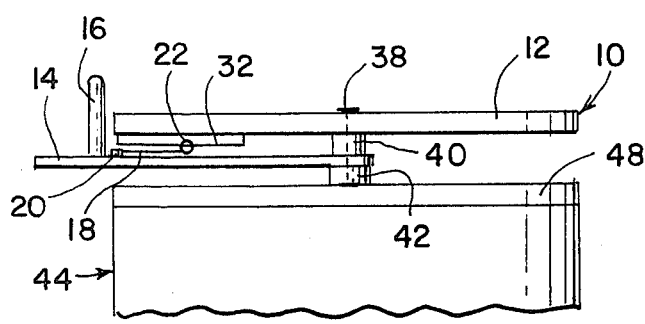
Fig. 3
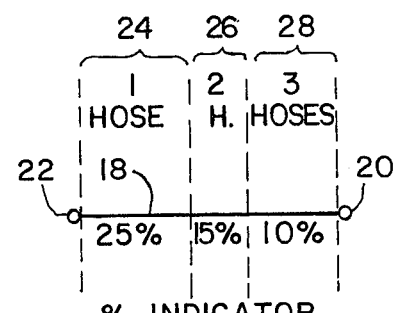
Fig. 4

GAUGE FOR INDICATING AVAILABLE WATER SUPPLY

BRIEF DESCRIPTION OF THE SEVERAL VIEWS OF THE INVENTION

FIG. 1 comprises a plan view of a water pressure gauge having a linear scale thereon for indicating water pressure;

FIG. 2 comprises a plan view of apparatus for exponentially indicating a linear movement of a reference marker such as the needle of the water pressure gauge illustrated in FIG. 1 according to one embodiment of the present invention;

FIG. 3 comprises a side elevation taken along the line 3—3 of FIG. 2; and

FIG. 4 comprises an indicator scale for determining the number of fire hoses that may be attached to a fire hydrant when there is a drop in water pressure of the hydrant and which is positionable to provide an exponentially decreasing indication of a number of fire hoses that may be attached to a fire hydrant as the water pressure decreases linearly at such a fire hydrant according to another embodiment of the present invention.

DETAILED DESCRIPTION

Apparatus for measuring and monitoring liquid flow is disclosed in the prior art U.S. Pat. Nos.: 3,759,098 Logsdon, et al.; 3,733,898 Yamamoto, et al.; 3,727,459 Boettner; 3,678,746 Corey; 3,699,812 Masmik; 3,677,086 Corey; 3,662,599 Masnik and 3,613,448 Benson, et al.

Fire fighting personnel have to be able to determine the available supply of water at a fire hydrant during fire fighting operations so that they may know how many hoses may be connected to a fire truck pump drawing water from a fire hydrant without loss of pressure to any one hose. Calculations have to be made to indicate this since the available pressure gauges which are connected to fire truck pumps and fire hydrants to read water pressure are calibrated linearly and as the pressure drops linearly the quantity of water delivered from the hydrant decreases exponentially. Accordingly, a direct readout of a change in water pressure cannot be used by itself to determine the number of additional hoses that may be connected to a fire truck pump obtaining water from a hydrant.

All of the aforementioned prior art references do not provide simple apparatus for converting a linear pressure drop reading into an exponential decrease of available water supply at a water source.

It is therefore an object of the present invention to overcome these and other difficulties encountered in the prior art.

It is a further object of the present invention to provide apparatus for exponentially indicating the linear movement of a movable reference marker.

It is also an object of the present invention to provide apparatus for correctly reading the exponential decrease in water supply from a water source having water supplied thereto under pressure when the pressure in the water supply decreases linearly and is indicated as a linear decrease on a water pressure gauge.

It is a further object of the present invention to provide a simple adaptor for a water pressure gauge affixed to a fire truck pump obtaining water from a fire hydrant so as to read water pressure whereby such apparatus of the invention will convert a linear decrease of water pressure into an exponential decrease of a quantity of water available from such water supply.

It is also an object of the present invention to provide apparatus which may be attached to a water gauge connected to a fire truck obtaining water from a fire hydrant so that when a linear drop of water pressure is measured linearly by the water gauge, the apparatus of the present invention will indicate exponentially the number of additional fire hoses that may be connected to the fire truck pump without loss of pressure or supply to any other hose.

These and other objects have been achieved according to the present invention and will become apparent by reference to the disclosure and claims that follow as well as the appended drawing.

Referring to the drawing and FIGS. 1-4 therein, apparatus 10 for exponentially indicating the linear movement of a movable reference marker such as a needle 46 of a water pressure gauge 44 is illustrated and comprises a clear transparent base or disc 12 having a movable arm 14 pivotally secured thereto at the base of arm 14 by means of a pin 38, a spacing member 40 and a spacing member 42. The movable arm 14 also has a knob 16 thereon for rotating the arm about the pin 38. An indicator 18 is provided divided into segments 24, 26 and 28, each segment bearing indicia thereon to indicate a percentage change or the number of hoses that may be added to a fire truck pump obtaining water from a fire hydrant when the apparatus of the present invention is employed over a water pressure gauge 44 attachable to such a fire truck pump. Additionally, the indicia on segments 24, 26 and 28 may also indicate a percentage change and in the embodiment illustrated in FIG. 4 segment 24 may be marked to indicate that one hose may be added where a 25% decrease or less in water pressure is signified, segment 26 may indicate that two hoses may be added where a 15% drop in water pressure or less is indicated and alternately three hoses may be added where a 10% drop in water pressure or less is indicated.

The indicator 18 is pivotally secured to arm 14 by means of a pivot 20, the other end of indicator 18 being secured to a track 32 such as a cam wire by means of a loop 22 which slides on the cam wire 32 as the movable arm 14 is placed in any position, i.e., positions 1, 2, 3 or 4 illustrated in FIG. 2. The track or cam wire 32 is secured to and positioned on the base 12 at an angle to the movable arm 14 so that when the indicator 18 is moved by the movable arm 14, the angle of alignment of pivot 20 and loop 22 with respect to movable arm 14 is changed and in the embodiment illustrated, the slope of such angle is increased as the arm 14 is moved between the upper limits of gauge to lower limit. As in example positions number 1, 2, 3 and 4 in FIG. 2.

A water pressure gauge 44 having a needle 46 and a dial face 48 with a graduated scale thereon for linearly indicating pressure between 0 psi and 100 psi is illustrated as may be found on a fire engine. The scale does not stop at 100 psi but hydrants of 100 psi or higher are very rare so the invention for descriptive purposes only goes to 100 psi. The apparatus 10 is positionable over the water pressure gauge 44 as is illustrated in FIG. 3.

In use, the apparatus 10 is positioned over the water pressure gauge 44 as is illustrated in FIG. 3 and reference mark 30 on disc 12 is positioned over the zero reading on dial 48. The water pressure gauge is a standard part of any fire truck pump obtaining water from a fire hydrant and the movable arm 14 aligned with the needle 46 which is read in static pressure of hydrant. A length of hose is connected to the fire truck on which gauge 44 (compound gauge) is mounted and water delivered through the hose. As the pressure drops between 100 and 75 psi, if static pressure hydrant was 100 psi and arm 14 is set for 100 psi, needle 46 will register or point to segments 24, 26 or 28 on indicator 18 indicating the percentage drop of water pressure and the number of additional hoses that may be connected to the hydrant. If the original pressure is 75 psi, the movable arm 14 is aligned at 75 psi and the indicator 18 is moved slidingly down the track or cam wire 32 to the position shown in phantom configuration 18 when movable arm 14 is at position 2. The movable arm 14 may also be set at any pressure corresponding to the original pressure (static pressure of hydrant) indicated by needle 46, e.g., 63 psi, 47 psi and so forth and indicator 18 will give a subsequent reading of percentage pressure drop and the number of hoses that may be added. It should be noted that the slope of the angle between points 22 and 20 on indicator 18 and the movable arm 14 increase from position 1 to position 2 and accordingly, the linear movement of needle 46 which is viewed through transparent disc 12 will be viewed against the scales 24, 26, 28 of indicator 18 and an exponential value will be obtained with respect to the linear movement of needle 46 against the indicator 18 in this position. Similarly, when movable arm 14 is moved into position 3 or position 4 because of a static pressure of 50 psi or 25 psi, the slope of the angle between points 20 and 22 on indicator 18 and movable arm 14 will be increased even further and the reading of any movement of needle 46 against the scale 24, 26 and 28 (segments) of indicator 18 will also be exponential in function.

The cam wire 32 or track is adjusted or calibrated emperically depending upon the type of gauge over which the apparatus 10 is positioned. Note once arm 14 is set to match the static pressure noted by needle 46 it must not be moved until operating with another hydrant which of course will have another pressure.

Although the invention has been described by reference to some embodiments, it is not intended that the novel apparatus for exponentially indicating the linear movement of a movable reference marker be limited thereby, but that modifications thereof are intended to be included as falling within the broad spirit and scope of the foregoing disclosure, the following claims and the appended drawing.

What is claimed is:

1. Apparatus for exponentially indicating the linear movement of a movable reference marker comprising base means for tracking the movement of a movable reference marker, a first point on said indicator means pivotally secured to a movable arm, said arm being movably secured to said base for positioning said indicator means on said base, said arm being movable to project into the path of a movable reference marker, a second point on said indicator means being slidably mounted on track means, said track means being secured to and positioned on said base at an angle to said arm so that when said indicator means is moved by said arm, the angle of alignment of said first point and said second point on said indicator means is changed with respect to said arm, said indicator means being positionable in the path of a movable reference marker.

2. The apparatus of claim 1 where said indicator means has a graduated scale thereon positionable in the path of a movable reference marker.

3. The apparatus of claim 2 where said graduated scale is positioned between said first point and said second point on said indicator means.

4. The apparatus of claim 1 where said positioning means comprises an arm alignable with the scale of a movable reference marker, the linear movement of which is exponentially indicated by such apparatus of claim 1.

5. The apparatus of claim 1 where said track means comprises a wire secured at the ends thereof to said base, said second point on said indicator extends in a loop around said wire.

6. Apparatus for exponentially indicating the linear change of fluid pressure indicated by the linear movement of a needle positioned against a scale graduated in equal units of pressure said apparatus comprising a base for supporting said apparatus, a movable indicator for tracking the movement of a movable needle positioned against a scale graduated in equal parts of pressure, said indicator having a graduated scale thereon positionable in the path of such a movable needle, a first point on said movable indicator pivotally secured to a movable arm, said movable arm being movably secured to said base for positioning said indicator on said base, said arm being movable to project into the path of said needle, a second point on said indicator slidably mounted on a track, said track being secured to and positioned on said base at an angle to said movable arm so that when said indicator is moved, the angle of alignment of said first point and said second point on said indicator is changed with respect to said movable arm.

7. The apparatus of claim 6 for exponentially indicating the linear change of water pressure from a hydrant indicated by the linear movement of a needle positioned against a scale graduated in equal units of pressure on a water-pressure gauge, said apparatus comprising a transparent base for positioning over a water-pressure gauge, said transparent base supporting said apparatus, a movable indicator for tracking the movement of a movable needle positioned against a scale graduated in equal units of water pressure, a first point on said movable indicator pivotally secured to a movable arm, said indicator having a graduated scale thereon positionable in the path of a needle of a water-pressure gauge, said scale being calibrated to indicate the number of additional fire hoses that may be connected to a fire hydrant after a drop of water pressure in the fire hydrant, said movable arm being movably secured to said base for positioning said indicator on said base, said movable arm being arranged to be aligned with the needle of a water pressure gauge attachable to a fire hydrant for the purpose of supplying a reference point for said indicator, a second point on said indicator slidably mounted on a track, said track being secured to and positioned on said base at an angle to said movable arm so that when the indicator is moved, the angle of alignment of said first point and said second point on said indicator is changed with respect to said movable arm.

8. The apparatus of claim 7 where said track is secured to and positioned on said base at an angle to said movable arm so that when said indicator means is moved by said movable arm the angle of alignment of said first point and said second point on said indicator with respect to said movable arm is changed so that the slope of said angle is increased as said movable arm is positioned for alignment with lower pressure readings of a water pressure gauge scale graduated in equal units against which said apparatus may be placed.

* * * * *